United States Patent
Cheron et al.

(10) Patent No.: US 9,176,505 B2
(45) Date of Patent: Nov. 3, 2015

(54) BACKPRESSURE REGULATOR WITH EASY PUMP START-UP

(71) Applicant: EMERSON PROCESS MANAGEMENT REGULATOR TECHNOLOGIES, INC., McKinney, TX (US)

(72) Inventors: Bruno Jean Michel Cheron, McKinney, TX (US); Garrett Winston, Addison, TX (US); Douglas J. Scheffler, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 225 days.

(21) Appl. No.: 14/067,417

(22) Filed: Oct. 30, 2013

(65) Prior Publication Data
US 2014/0182694 A1    Jul. 3, 2014

Related U.S. Application Data

(60) Provisional application No. 61/746,636, filed on Dec. 28, 2012.

(51) Int. Cl.
*F16K 31/12* (2006.01)
*G05D 16/06* (2006.01)
(Continued)

(52) U.S. Cl.
CPC ............. *G05D 16/06* (2013.01); *A62C 35/68* (2013.01); *G05D 16/166* (2013.01); *Y10T 137/0379* (2015.04); *Y10T 137/7762* (2015.04)

(58) Field of Classification Search
CPC ..... G05D 16/06; G05D 16/166; A62C 35/68; Y10T 137/7762; Y10T 137/0379; Y10T 137/7768; Y10T 137/777; Y10T 137/7781; Y10T 137/7793; Y10T 137/7794; Y10T 137/7796
USPC ............. 137/488, 494, 489.5, 492.5, 12, 505, 137/505.11, 505.13
See application file for complete search history.

(56) References Cited

U.S. PATENT DOCUMENTS 3,020,925 A * 2/1962 Randall et al. ............. 137/489.5
3,977,423 A * 8/1976 Clayton ........................ 137/12
(Continued)

FOREIGN PATENT DOCUMENTS

DE         40 36 723 A1      5/1992

OTHER PUBLICATIONS

International Preliminary Report on Patentability and Written Opinion for applicaiton No. PCT/US2013/078217, dated Jul. 9, 2015.
(Continued)

*Primary Examiner* — Craig Schneider
*Assistant Examiner* — Minh Le
(74) *Attorney, Agent, or Firm* — Marshall, Gerstein & Borun LLP

(57) ABSTRACT

A system and method for automatically performing start-up and overpressure relief functions in association with a primary fluid carrier such as, for example, a liquid handling pipeline or tank. The system includes a main valve for primarily exhausting air from the system as it fills with a liquid. A start-up pilot device is also provided for exhausting air from the system upon start-up, but prior to the main valve opening. Finally, an overpressure pilot device is provided to relieve overpressure situations during normal operation.

33 Claims, 3 Drawing Sheets

(51) Int. Cl.
*A62C 35/68* (2006.01)
*G05D 16/16* (2006.01)

(56) References Cited

U.S. PATENT DOCUMENTS

| | | | | |
|---|---|---|---|---|
| 4,442,680 | A * | 4/1984 | Barbier et al. | 62/217 |
| 4,586,533 | A * | 5/1986 | Estes | 137/488 |
| 4,617,958 | A * | 10/1986 | Seidel et al. | 137/492.5 |
| 4,846,210 | A * | 7/1989 | Loxley | 137/110 |
| 4,917,144 | A * | 4/1990 | Giles | 137/488 |
| 5,135,360 | A * | 8/1992 | Anderson et al. | 417/53 |
| 5,183,074 | A * | 2/1993 | Reese | 137/488 |
| 5,348,036 | A * | 9/1994 | Oksanen et al. | 137/1 |
| 5,555,910 | A | 9/1996 | Powell et al. | |
| 5,725,015 | A * | 3/1998 | Theodos et al. | 137/488 |
| 5,735,308 | A * | 4/1998 | Yokota et al. | 137/488 |
| 6,035,878 | A * | 3/2000 | Adams et al. | 137/1 |
| 6,076,545 | A | 6/2000 | Cooper | |
| 6,209,577 | B1 * | 4/2001 | Lai et al. | 137/489.5 |
| 6,286,534 | B1 * | 9/2001 | Bliss | 137/14 |
| 6,371,156 | B1 * | 4/2002 | Walton et al. | 137/488 |
| 6,415,815 | B1 * | 7/2002 | Blann et al. | 137/494 |
| 6,584,999 | B2 * | 7/2003 | Inayama et al. | 137/487.5 |
| 6,595,237 | B2 * | 7/2003 | Cecchinato et al. | 137/489.5 |
| 6,684,898 | B2 * | 2/2004 | Wiggins et al. | 137/15.25 |
| 8,047,226 | B2 * | 11/2011 | Kesner et al. | 137/489 |
| 8,091,582 | B2 * | 1/2012 | Folk | 137/489 |
| 8,381,761 | B2 * | 2/2013 | Re | 137/489.5 |
| 2009/0288718 | A1 * | 11/2009 | Jablonski | 137/486 |
| 2011/0297252 | A1 * | 12/2011 | Hurley et al. | 137/488 |
| 2014/0090725 | A1 * | 4/2014 | Diaz et al. | 137/489.5 |
| 2014/0150902 | A1 * | 6/2014 | Pirat | 137/487.5 |

OTHER PUBLICATIONS

Search Report for PCT/US2013/078217 mailed Oct. 9, 2014.
Written Opinion for PCT/2013/078217 mailed Oct. 9, 2014.

\* cited by examiner

BACKPRESSURE REGULATOR WITH EASY PUMP START-UP

CROSS-REFERENCE TO RELATED APPLICATIONS

The priority benefit of U.S. Provisional Patent Application No. 61/746,636, filed Dec. 28, 2012, is hereby claimed and the entire contents thereof are incorporated herein by reference.

FIELD OF THE DISCLOSURE

The present disclosure relates to fluid delivery and handling systems and, more particularly, to systems and methods for providing start-up and overpressure relief functionality for liquid delivery and handling systems.

BACKGROUND

Liquid delivery and handling systems such as, for example, industrial fire sprinkler systems are adapted to accommodate a liquid such as water under pressure. As such, when the system is activated the pressurized water is exhausted through any number of nozzles or sprinklers for extinguishing the fire. Upon initial installation, for example, the various pipelines, valves, nozzles, and sprinklers art not filled with water, but rather, contain air at generally atmospheric pressure. When the system is filled with water, a process that can be referred to as "start-up," the air in the system must be exhausted through some sort of exhaust valving arrangement. This exhausting of the air can be referred to as "start-up relief." Many conventional exhaust valving arrangements include manually operable valves, which are opened upon "start-up" and manually closed when all the air is exhausted. Once all the air is exhausted, the system is completely filled with water and pressurized to a target pressure. Increases in pressure above the target pressure, which can result from environmental changes or changes in the source of water supply, for example, and can detrimentally affect the operation and useful life of the system. Therefore, some conventional systems also include an overpressure relief valving arrangement that is configured to relieve the pressure in the system back down to the target pressure, a process which can be referred to as "overpressure relief." Some conventional overpressure relief valving arrangements are either manually operated in response to an alarm, for example, or operate based on the sensing of pressure in the system. Regardless of the specific exhaust and relief valving arrangements conventionally used, the two arrangements operate independently of each other and require at least some amount of user input or attention to ensure proper "start-up relief" and/or "overpressure relief" functionality.

SUMMARY

One aspect of the present disclosure provides a fluid control system for providing start-up and overpressure relief functions to a primary fluid carrier. The system can include a main valve, a start-up pilot device, and an overpressure pilot device. The main valve can have an inlet, an outlet, a gallery disposed between the inlet and the outlet, a valve seat fixedly disposed in the gallery, and a valve plug slidably disposed in the gallery between a closed position engaging the valve seat and an open position spaced away from the valve seat. The valve plug can be biased toward the closed position via a control spring. The start-up pilot device and the overpressure pilot device can each include a valve body and a control assembly including a diaphragm having opposite first and second surfaces and operably coupled to a valve plug. The valve body can include an inlet port, an outlet port, and a valve port disposed between the inlet port and the outlet port, wherein the valve plug can be movable between a closed position engaging the valve port and an open position spaced away from the valve port. In some versions, the valve plug of the start-up pilot device can be biased toward the open position by a start-up control force applied to the first surface of the diaphragm of the start-up pilot device, and the valve plug of the overpressure pilot device is biased toward the closed position by an overpressure control force applied to the first surface of the diaphragm of the overpressure pilot device.

The system can further include a first supply line providing fluid communication between the inlet of the main valve, the inlet port of the start-up pilot device, and the gallery of the main valve. The system can further include a first exhaust line providing fluid communication between the outlet port of the start-up pilot device and the outlet of the main valve. The system can further include a first sensing line providing fluid communication between the second surface of the diaphragm of the start-up pilot device and a first registration source. The system can further include a second sensing line providing fluid communication between the second surface of the diaphragm of the overpressure pilot device and a second registration source. The system can further include a second exhaust line providing fluid communication between the outlet port of the overpressure pilot device and the outlet of the main valve. Finally, the system can further include a second supply line providing fluid communication between the inlet port of the overpressure pilot device and the gallery of the main valve.

DETAILED DESCRIPTION

Figure 1:
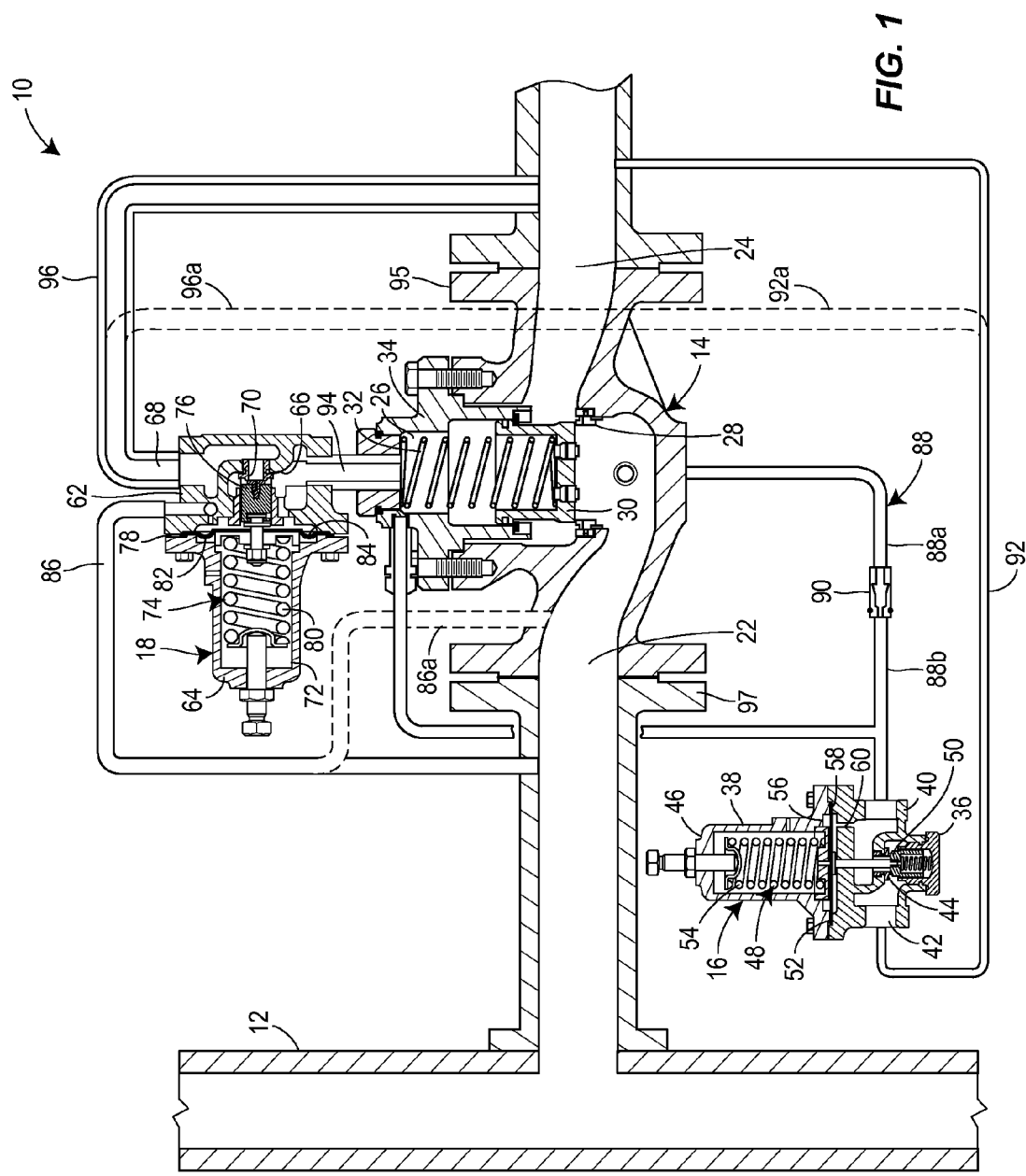
FIG. 1 is a side cross-sectional view of one version of a fluid control system for providing start-up and overpressure relief functions to a primary fluid carrier in accordance with the principles of the present disclosure.

The present disclosure is related to systems and methods for automatically performing start-up relief and overpressure relief functions in association with a primary fluid carrier such as, for example, a liquid handling pipeline or tank. FIG. 1 illustrates one example of a system 10 constructed in accordance with the principles of the present disclosure connected to a fluid handling pipeline 12. During normal operation, fluid is resident within or flowing through the fluid handling pipeline 12. The same fluid is also resident in the system 10, but only flows through the system 10 upon "start-up" or upon the occurrence of an overpressure situation in the pipeline 12.

To facilitate the desired operation in each of these situations, the system 10 of FIG. 1 includes a main valve 14, a start-up pilot device 16, and an overpressure pilot device 18. The start-up and overpressure pilot devices 16, 18 are in direct and continuous fluid communication with the main valve 14 and operate completely independently of any external signaling or manual manipulation. Activation of each of the components of the system 10 is based solely on changes in the pressure of the fluid in the pipeline 12, thereby providing a simple, robust, reliable, and automatically operating system.

With continued reference to FIG. 1, the main valve 14 includes a valve body 20 defining an inlet 22, an outlet 24, and a gallery 26 disposed between the inlet 22 and the outlet 24. The main valve 14 further includes a seat ring 28, a valve plug 30, and a control spring 32, each of which are disposed in the gallery 26 in a conventional manner. In the disclosed version of the main valve 14, a bonnet 34 is bolted to a top of the main valve 14 above the gallery 26 to retain the control spring 30 and valve plug 30 therein. So configured, the valve plug 30 is slidably disposed in the gallery 26 between a closed position (shown in FIG. 1) engaging the seat ring 28 and an open position spaced away from the seat ring 28. The control spring 32, as shown, is grounded against the bonnet 34 and applies a loading force to the valve plug 30 to bias the valve plug 30 toward the closed position.

The start-up pilot device 16 of the example in FIG. 1 is a pressure reducing regulator including a valve body 36 and an actuator 38 connected to the valve body 36. In one version of the system 10, the start-up pilot device 16 can be a Type 95H Pressure Reducing Regulator, which is commercially available from Emerson Process Management Regulator Technologies, Inc., but mounted in reverse relative to its conventional use. This pilot device is just one example, however, and other pilot devices including pilot devices with internal or external control lines are intended to be within the scope of the present disclosure. One such alternative could be, for example, the Type MR95H device, from Emerson Process Management Regulator Technologies, Inc. As depicted in FIG. 1, the valve body 36 includes an inlet port 40, an outlet port 42, and a valve port 44 positioned between the inlet and outlet ports 40, 42. The actuator 38 includes an actuator casing 46 that accommodates a control assembly 48. The control assembly 48 includes a valve plug 50, a diaphragm 52 operably coupled to the valve plug 50, and a loading spring 54. The valve plug 50 is positioned in the valve body 36 of the start-up pilot device 16 and slidable between a closed position engaging the valve port 44 and an open position spaced away from the valve port 44. The diaphragm 52 is disposed in the actuator casing 46 and includes opposite first and second surfaces 56, 58. Relative to the orientation of FIG. 1, the first surface 56 is the top surface of the diaphragm 52 and the second surface 58 is the bottom surface of the diaphragm 52.

The first surface 56 of the diaphragm 52 is engaged by the loading spring 54 such that the loading spring 54 applies a start-up control force to bias the diaphragm 52 and the valve plug 50 toward the open position. In the disclosed version of the start-up actuator device 16, this means that the loading spring 54 biases the diaphragm 52 and the valve plug 50 downward relative to the orientation of FIG. 1. So configured, the start-up pilot device 16 can be referred to as a "normally open" fluid flow control device because in the absence of other forces, the start-up control force applied by the loading spring 54 positions the valve plug 50 in the open position.

As shown in FIG. 1, the present version of the start-up pilot device 16 is configured such that the second surface 58 of the diaphragm 52 is in fluid communication with a sensing line 60. The sensing line 60 is in fluid communication with as pressure registration source that is ultimately relied upon for applying a start-up closing pressure to the second surface 58 of the diaphragm 52 for moving the diaphragm 52 upward and closing the valve port 44 with the valve plug 50. In one version, the sensing line 60 can be a pitot tube and the pressure registration source with which the pitot tube communicates is the inlet 22 of the main valve 14 via the inlet port 40 of the valve body 36 of the start-up pilot device 16.

Still referring to FIG. 1, the overpressure pilot device 18 of the present version of the system 10 is a pilot-operated relief valve including a valve body 62 and an actuator 64 connected to the valve body 62. In one version of the system 10, the overpressure pilot device 18 can be a Type 98HM Pilot-Operated Relief Valve, which is commercially available from Emerson Process Management Regulator Technologies, Inc. This is just one example, however, and other pilot devices could be used and are intended to be within the scope of the present disclosure. One such pilot device could include, for example, the Type MR98HM device, from Emerson Process Management Regulator Technologies, Inc. As depicted in FIG. 1, the valve body 62 includes an inlet port 66, an outlet port 68, and a valve port 70 positioned between the inlet and outlet ports 66, 68. The actuator 64 includes an actuator casing 72 that accommodates a control assembly 74. The control assembly 74 includes a valve plug 76, a diaphragm 78 operably coupled to the valve plug 76, and a loading spring 80. The valve plug 76 is positioned in the valve body 62 of the overpressure pilot device 18 and slidable between a closed position engaging the valve port 70 (shown in FIG. 1) and an open position spaced away from the valve port 70. The diaphragm 78 is disposed in the actuator casing 72 and includes opposite first and second surfaces 82, 84. Relative to the orientation of FIG. 1, the first surface 82 is the left surface of the diaphragm 78 and the second surface 84 is the right surface of the diaphragm 78.

The first surface 82 of the diaphragm 78 is engaged by the loading spring 80 such that the loading spring 80 applies an overpressure control force to bias the diaphragm 78 and the valve plug 76 toward the valve port 70 and into the closed position. In the disclosed version of the overpressure pilot device 18, this means that the loading spring 80 biases the diaphragm 78 and the valve plug 76 toward the right relative to the orientation of FIG. 1. So configured, the overpressure pilot device 18 can be referred to as a "normally closed" fluid flow control device because in the absence of other forces, the overpressure control force applied by the loading spring 80 positions the valve plug 76 in the closed position.

As shown in FIG. 1, the present version of the overpressure pilot device 18 is configured such that the second surface 84 of the diaphragm 78 is in fluid communication with a sensing line 86. In one version, the sensing line 86 that is in fluid communication with a pressure registration source that is ultimately relied upon for applying a relief opening pressure to the second surface 84 of the diaphragm 78 for moving the diaphragm 78 to the left in FIG. 1 for opening the valve port 70 with the valve plug 76. In the depicted version, the pressure registration source with which the sensing line 86 communicates is the inlet 22 of the main valve 14.

As mentioned, the start-up and overpressure pilot devices 16, 18 of the system 10 depicted in FIG. 1 are in direct fluid communication with the main valve 14 and operate completely independently of any external signaling, inputting, or manual manipulation. This is achieved in part by the sensing line 60 providing fluid communication between the second surface 58 of the diaphragm 52 and the inlet port 40 of the start-up pilot device 16 and inlet 22 of the main valve 14, as well as by the sensing line 86 providing fluid communication between the second surface 84 of the diaphragm 78 of the overpressure pilot device 18 and the inlet 22 of the main valve 14. The system 10, however, also includes additional fluid lines to achieve the desired functionality.

Specifically, with reference to the start-up pilot device 16 in FIG. 1, the present version of the system 10 includes a start-up supply line 88 and a start-up exhaust line 92 connected to the start-up pilot device 16. The start-up exhaust line 92 extends directly between and provides direct and continuous fluid communication, without interruption or detour, between the outlet port 42 of the start-up pilot device 16 and the outlet 24 of the main valve 14. The start-up supply line 88 extends between and provides direct and continuous fluid communication between the inlet 22 of the main valve 14, the inlet port 40 of the start-up pilot device 16, and the gallery 26 of the main valve 14. More particularly, the start-up supply line 88 includes a first line portion 88a that extends between the inlet 22 of the main valve 14 and a second line portion 88b that branches off of the first line portion 88a and therefore extends between the first line portion 88a and the gallery 26 of the main valve 14. More specifically, as shown in FIG. 1, the second line portion 88b of the start-up supply line 88 communicates with the gallery 26 at a location above the valve plug 30 where the control spring 32 is located. Thus, the pressure supplied to the gallery 26 via the start-up supply line 88 assists the control spring 32 in closing the valve plug 30. With the start-up supply line 88 so configured, pressure from the inlet 22 of the main valve 14 is communicated to the inlet port 40 of the start-up pilot device 16 via the first line portion 88a. Moreover, pressure from the inlet 22 of the main valve 14 is communicated to the gallery 26 of the main valve 14 via the first line portion 88a and the second line portion 88b of the start-up supply line 88.

In the version depicted in FIG. 1, the first line portion 88a of the start-up supply line 88 is also equipped with a restrictor 90 at a location upstream from where the second line portion 88a intersects or branches off of the first line portion 88a. As such, the restrictor 90 is located on the start-up supply line 88 at a location between the inlet 22 of the main valve 14 and the inlet port 40 of the start-up pilot device 16, as well as between the inlet 22 of the main valve 14 and the gallery 26. The restrictor 90 can be included to slow the speed at which pressure changes occur in the inlet port 40 of the start-up pilot device 16. Moreover, because the restrictor 90 is located upstream from the second line portion 88b of the start-up supply line 88, the speed at which pressure changes are supplied to the gallery 26 via the start-up supply line 88 is also slowed. The restrictor 90 can be an adjustable restrictor or an orifice plate, for example. In one version, the restrictor 90 can be a Fisher Type 112 restrictor, which is commercially available from Emerson Process Management Regulator Technologies, Inc.

Referring now to the overpressure pilot device 18 depicted in FIG. 1, in addition to the sensing line 86, the system 10 includes a overpressure supply line 94 and an overpressure exhaust line 96 connected to the overpressure pilot device 18. The overpressure supply line 94 extends directly between and provides direct and continuous fluid communication between the gallery 26 of the main valve 14 and the inlet port 66 of the overpressure pilot device 18. More specifically, as shown in FIG. 1, the overpressure supply line 94 communicates with the gallery 26 at a location above the valve plug 30 where the control spring 32 is located. As such, the overpressure supply line 94 is also in fluid communication with the start-up supply line 88 and, more particularly, the second line portion 88b of the start-up supply line 88, via the gallery 26. The overpressure exhaust line 96 extends directly between and provides direct and continuous fluid communication, without interruption or detour, between the outlet port 68 of the overpressure pilot device 18 and the outlet 24 of the main valve 14.

With the system 10 of FIG. 1 configured as described above, the main valve 14 serves to provide the primary exhaust function for air in the system upon start-up. However, at low pressures at the early stage of the start-up process, the control spring 34 prevents air pressure at the inlet 22 of the main valve 14 from opening the valve plug 30 of the main valve 14. Therefore, at these low pressures upon start-up, the start-up pilot device 10 automatically provides an exhaust or relief function until the pressure in the inlet 22 of the main valve 14 is sufficient to open the main valve 14 and/or until the primary fluid handling pipeline 12 and the system 10 are filled with water, for example. Finally, once the system 10 is filled with water and operating normally, the overpressure pilot device 18 can automatically provide an exhaust or relief function to relieve excess pressure in the pipeline 12 and system 10.

More specifically, upon start-up, the pipeline 12 and therefore the system 10 can be completely filled with air, or partly filled with air and the remainder filled with operating fluid such as water or generally some other fluid. After initiating start-up, a pump located upstream from the system 10 begins pumping water into the pipeline 12.

As water begins to fill the pipeline 12, the pressure of the air remaining in the system 10 may be relatively low, but also beginning to increase as it is compressed under the force of the emerging water. At these low pressures, the air at the inlet 22 of the main valve 14 is insufficient to open the valve plug 30 of the main valve 14, and as such, it is exhausted to the outlet 24 of the main valve 14 via the start-up supply line 88, the normally open start-up pilot device 16, and the start-up exhaust line 92. This ensures a fast and efficient start-up process.

As the pressure of the fluid at the inlet 22 of the main valve 14, it ultimately forces the valve plug 30 of the main valve 14 away from the valve seat 28 and into an open position to exhaust any remaining air in the system 10 directly through the gallery 26 and to the outlet 24 of the main valve 14. The increase in pressure at the inlet 22 of the main valve 14 is also ultimately sensed by the second surface 58 of the diaphragm 52 of the start-up pilot device 16 via the start-up supply line 88, inlet port 40, and sensing line 60, which will ultimately and automatically force the start-up pilot device 16 into the closed position.

With the start-up pilot device 16 closed, fluid pressure in the start-up supply line 88 is communicated to the top of the gallery 26 of the main valve 14, above the valve plug 30, via the second line portion 88b of the start-up supply line 88. As this pressure in the gallery 26 ultimately becomes equal to the pressure at the inlet 22 of the main valve 14, the loading of the control spring 32 in the gallery 26 closes the valve plug 30. This terminates the start-up function and the system 10 is completely closed, at which point, fluid in the pipeline 12 is maintained at the desired target pressure.

If an environmental or other change causes the pressure in the pipeline 12, and therefore in the inlet 22 of the main valve 14, to increase above the desired target pressure and above a pre-set threshold pressure, the overpressure pilot device 18 automatically responds to relieve that excess pressure and return the pipeline 12 and system 10 to the target pressure.

Specifically, during the normal operating condition, the overpressure pilot device 18 occupies its normally closed position due to the force generated by the loading spring 80 on the first surface 82 of the diaphragm 78. In this closed position, the valve plug 76 is seated against the valve port 70, thereby preventing fluid from flowing from the inlet port 66 to the outlet port 68.

However, the pressure at the inlet 22 of the main valve 14 is continuously monitored by the second surface 84 of the overpressure pilot device 18 via the sensing line 86. Thus, in the event the pressure at the inlet 22 of the main valve 14 exceeds a predetermined threshold pressure, which is set by the overpressure control force generated by the loading spring 80 of the overpressure pilot device 18, the diaphragm 78 will sense the pressure in the sensing line 86 and automatically move the valve plug 76 to the left relative to the orientation of FIG. 1, thereby opening the valve port 70. When this occurs, fluid pressure in the gallery 26 of the main valve 14 rushes through the valve port 70 and exhausts directly to the outlet 24 of the main valve 14 via the outlet port 68 of the overpressure pilot device 18 and the overpressure exhaust line 96. This exhausting of fluid from the gallery 26 has a direct effect on the pressure of fluid at the inlet 22 because the gallery 26 is also in fluid communication with the inlet 22 via the start-up supply line 88. Thus, when the pressure at the inlet 22 of the main valve 14 returns to a suitable pressure, the loading spring 80 of the overpressure pilot device 18 automatically forces the valve plug 76 back to the closed position to stop the overpressure relief process. Again, at this point, the pipeline 12 and system 10 proceed under normal operating conditions.

Thus, from the foregoing, it should be appreciated that the system 10 disclosed in FIG. 1 is a simple, robust, and reliable system that is also a fully closed system. That is, the system 10 includes two pilot devices 16, 18, each of which exhaust pressure from the pipeline 12, but neither of which exhausts to atmosphere. Rather, the system 10 is configured such that each pilot device 16, 18 communicates directly back to the outlet 24 of the main valve 14. From the outlet 24 of the main valve 14, the exhausted fluid can be recycled back into the system, delivered to a storage tank, or otherwise processed, thereby avoiding any air pollution concerns. Moreover, another advantage of the system 10 disclosed in FIG. 1 is that it operates completely automatically. That is, the system 10 requires no external input or control to switch between the start-up function, the normal operation, and the overpressure relief function. Rather, the pressure at the inlet 22 of the main valve 14 drives the operation of the entire system 10, thereby eliminating any and all need to include expensive controllers, manually operated valves, and/or other potentially failure prone equipment.

The system 10 in FIG. 1 illustrates the supply and overpressure exhaust lines 92, 96 as communicating with the outlet 24 of the main valve 14 at a location slightly downstream of an outlet connecting flange 95 of the main valve 14. This is merely an example, however, and as indicated with the dashed lines 96a, 92a in FIG. 1, each of these lines could easily be moved upstream the outlet connecting flange 95, thereby providing an even more compact and integral system 10. Similarly, while FIG. 1 depicts the overpressure sensing line 86 registering the pressure at the inlet 22 of the main valve 14 at a location slightly upstream of an inlet connecting flange 97 of the main valve 14, a more compact and integral system 10 could be achieved my moving this registration point to a location downstream from the inlet connecting flange 97, as indicated with dashed line 86a.

While the pilot devices 16, 18 of the system 10 have thus far been described and depicted as including loading springs 54, 80 providing the start-up and overpressure control forces to open the start-up pilot device 16 and close the overpressure pilot device 18, respectively, in an alternative version not shown, the system 10 could also include an adjustable external source of pressurized air in communication with the first surface 56 of the diaphragm 52 of the start-up pilot device 16 and/or the first surface 82 of the diaphragm 78 of the overpressure pilot device 18. The external source of pressurized air could be used in addition to the loading springs 54, 80 or as a substitute for the loading springs 54, 80 for creating the start-up and/or overpressure control forces, depending on the circumstances of the application.

Thus, it should be appreciated that the system and method described with reference to FIG. 1 are merely examples and variations thereof are intended to be within the scope of the present disclosure.

Figure 2:
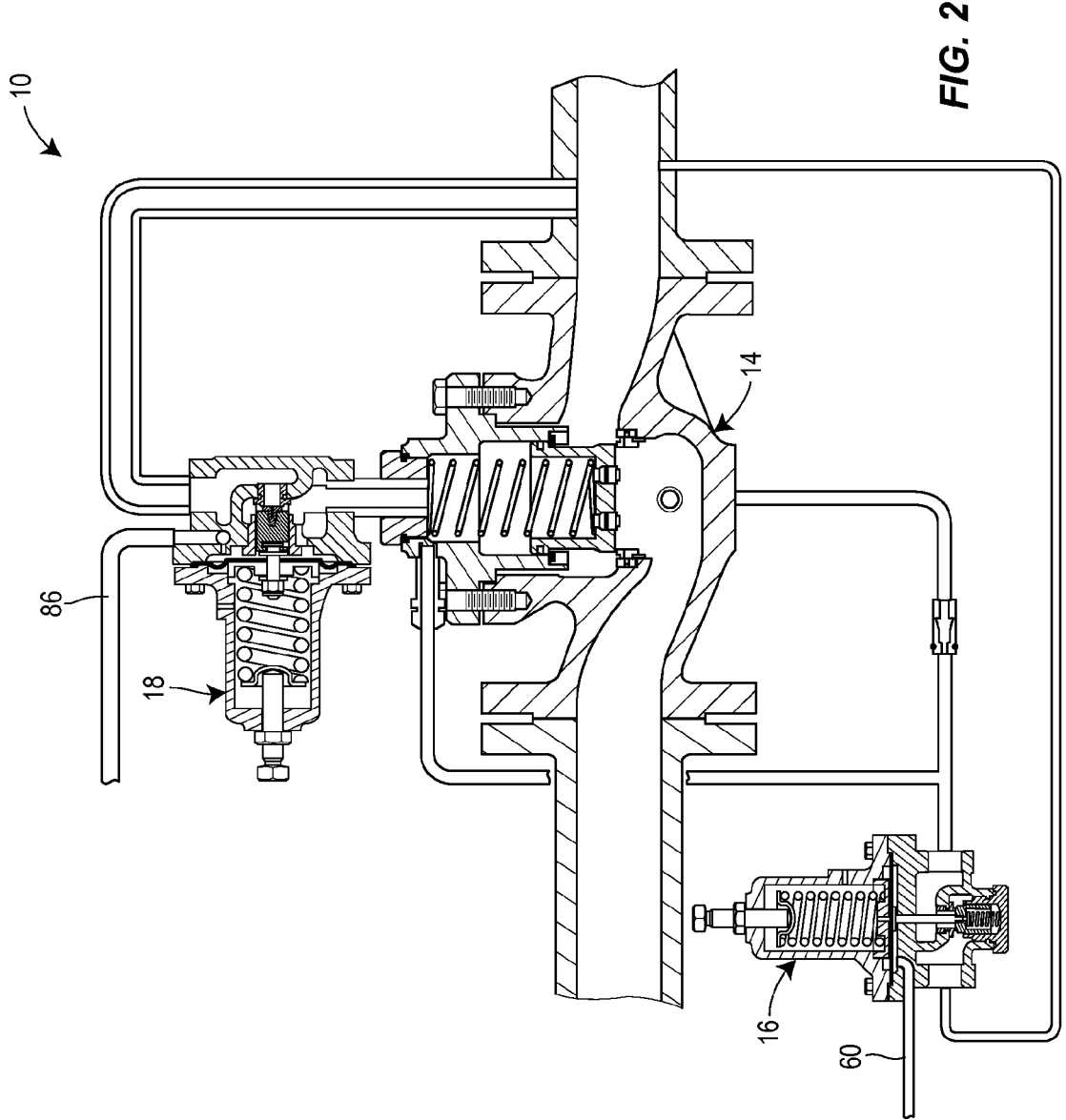
FIG. 2 is a side cross-sectional view of a modified version of the fluid control system of FIG. 1.

For example, FIG. 2 depicts one variation of the system 10 of FIG. 1 wherein the overpressure sensing line 86 and the start-up sensing line 60 are configured to register pressures from locations external to the system 10. In FIG. 2, the sensing lines 60, 86 could register pressures from the pipeline (not shown in FIG. 2) at a location upstream of the system 10 or downstream from the system 10, for example, or from generally any other location. Moreover, the sensing lines 60, 86 in FIG. 2 could register pressures from a completely external source such as a source of compressed fluid intended solely for providing the start-up closing pressure and/or the relief opening pressure for driving the start-up pilot device 16 closed and the overpressure pilot device 18 open, respectively. Although not depicted, in another version, one of the sensing lines 86, 60 of the system 10 of FIG. 2 could be piped as shown in FIG. 1, while the other is piped as shown in FIG. 2.

Figure 3:
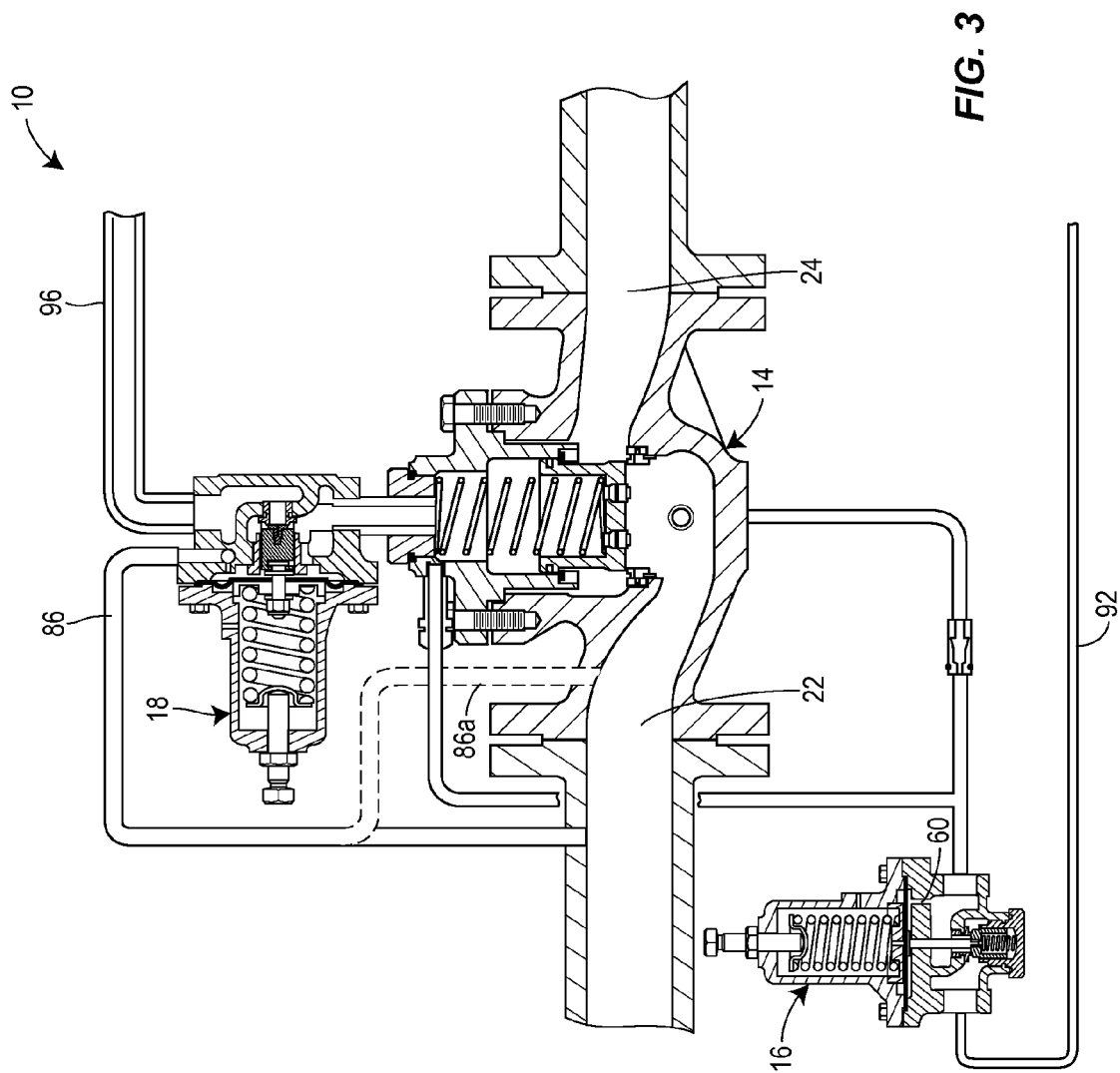
FIG. 3 is a side cross-sectional view of another modified version of the fluid control system of FIG. 1.

FIG. 3 depicts still another alternative version of the system 10 of FIG. 1, wherein the sensing lines 86, 60 remain as they are in FIG. 1, but the start-up and overpressure exhaust lines 92, 96 are not connected directly back to the outlet 24 of the main valve 14. Instead, each of the exhaust lines 92, 96 could be piped directly to a storage tank, to another location in the system, or even to atmosphere. Although not depicted, in one version, one of the exhaust lines 92, 96 could be piped directly to the outlet 24 of the main valve 14.

While the system 10 of the present disclosure has thus far been described as including a start-up pilot device 16 and an overpressure pilot device 18 that is a separate physical structure from the start-up pilot device 16, the system 10 could also be constructed in a manner in which the start-up and overpressure pilot devices 16, 18 are combined into a single device, e.g., a single physical construct. For example, in such a system 10, the various components of the start-up and overpressure pilot device 16, 18 could be machined into, cast into, or otherwise formed from a single block of material (e.g., a metal material) or multiple blocks of material secured together. So configured, the two pilot device 16, 18 could function as two separate devices, although they reside within a common physical device, as opposed to the two separate devices depicted in FIGS. 1-3.

Thus a variety of changes and modifications to the system 10 can be useful depending on a desired end application and such changes and modifications are intended to be within the scope of the disclosure. Accordingly, the scope of the invention is not to be defined by the examples discussed herein and shown in the attached figures, but rather, the claims that are ultimately issued in a patent and all equivalents thereof.

We claim:

1. A fluid control system for providing start-up and overpressure relief functions to a primary fluid carrier, the system comprising:

a main valve having an inlet, an outlet, a gallery disposed between the inlet and the outlet, a valve seat fixedly disposed in the gallery, and a valve plug slidably disposed in the gallery between a closed position engaging the valve seat and an open position spaced away from the valve seat, the valve plug being biased toward the closed position via a control spring;

a start-up pilot device and an overpressure pilot device, each of the start-up and overpressure pilot devices including a valve body and a control assembly including a diaphragm having opposite first and second surfaces and operably coupled to a valve plug, the valve body including an inlet port, an outlet port, and a valve port disposed between the inlet port and the outlet port, the valve plug movable between a closed position engaging the valve port and an open position spaced away from the valve port, wherein the valve plug of the start-up pilot device is biased toward the open position by a start-up control force applied to the first surface of the diaphragm of the start-up pilot device, and the valve plug of the overpressure pilot device is biased toward the closed position by a overpressure control force applied to the first surface of the diaphragm of the overpressure pilot device;

a first supply line providing fluid communication between the inlet of the main valve, the inlet port of the start-up pilot device, and the gallery of the main valve;

a first exhaust line providing fluid communication between the outlet port of the start-up pilot device and the outlet of the main valve;

a first sensing line providing fluid communication between the second surface of the diaphragm of the start-up pilot device and a first registration source;

a second sensing line providing fluid communication between the second surface of the diaphragm of the overpressure pilot device and a second registration source;

a second exhaust line providing fluid communication between the outlet port of the overpressure pilot device and the outlet of the main valve; and a second supply line providing fluid communication between the inlet port of the overpressure pilot device and the gallery of the main valve.

2. The system of claim 1, wherein at least one of the first and second registration sources is the inlet of the main valve.

3. The system of claim 1, wherein the first registration source is the inlet of the main valve and the first sensing line includes a pitot tube providing fluid communication between the inlet port of the start-up pilot device and the second surface of the diaphragm of the start-up pilot device.

4. The system of claim 1, wherein at least one of the first and second registration sources is external to the main valve.

5. The system of claim 1, wherein the control spring of the main valve directly engages the valve plug of the main valve to bias the valve plug toward the closed position.

6. The system of claim 1, wherein the start-up pilot device includes a start-up control spring providing the start-up control force, and the overpressure pilot device includes an overpressure control spring providing the overpressure control force.

7. The system of claim 1, further comprising a restrictor coupled into the first supply line between the inlet of the main valve and the inlet port of the start-up pilot device.

8. The system of claim 7, wherein the restrictor includes one of an adjustable restrictor or an orifice plate.

9. The system of claim 1, wherein the start-up pilot device and the overpressure pilot device are separate physical structures.

10. The system of claim 1, wherein the start-up device and the overpressure pilot device are parts of a common physical construct.

11. A fluid control system for providing start-up and overpressure relief functions to a primary fluid carrier, the system comprising:

a main valve having an inlet, an outlet, a gallery disposed between the inlet and the outlet, a valve seat fixedly disposed in the gallery, and a valve plug slidably disposed in the gallery between a closed position engaging the valve seat and an open position spaced away from the valve seat, the valve plug being biased toward the closed position via a control spring;

a start-up pilot device and an overpressure pilot device, each of the start-up and overpressure pilot devices including a valve body and a control assembly including a diaphragm having opposite first and second surfaces and operably coupled to a valve plug, the valve body including an inlet port, an outlet port, and a valve port disposed between the inlet port and the outlet port, the valve plug movable between a closed position engaging the valve port and an open position spaced away from the valve port, wherein the valve plug of the start-up pilot device is biased toward the open position by a start-up control force applied to the first surface of the diaphragm of the start-up pilot device, and the valve plug of the overpressure pilot device is biased toward the closed position by an overpressure control force applied to the first surface of the diaphragm of the overpressure pilot device;

a first supply line providing fluid communication between the inlet of the main valve, the inlet port of the start-up pilot device, and the gallery of the main valve;

a first exhaust line providing fluid communication away from the outlet port of the start-up pilot device to a first target destination;

a first sensing line providing fluid communication between the second surface of the diaphragm of the start-up pilot device and a first registration source;

a second sensing line providing fluid communication between the second surface of the diaphragm of the overpressure pilot device and a second registration source, wherein at least one of the first and second registration sources includes the inlet of the main valve;

a second exhaust line providing fluid communication between the outlet port of the overpressure pilot device and a second target destination; and a second supply line providing fluid communication between the inlet port of the overpressure pilot device and the gallery of the main valve.

12. The system of claim 11, wherein each of the first and second registration sources comprises the inlet of the main valve.

13. The system of claim 11, wherein at least one of the first and second target destinations is the outlet of the main valve.

14. The system of claim 11, wherein at least one of the first and second target destinations is atmosphere.

15. The system of claim 11, wherein the first sensing line includes a pitot tube providing fluid communication between the inlet port of the start-up pilot device and the second surface of the diaphragm of the start-up pilot device.

16. The system of claim 1, wherein the control spring of the main valve directly engages the valve plug of the main valve to bias the valve plug toward the closed position.

17. The system of claim 11, wherein the start-up pilot device includes a start-up control spring providing the start-up control force, and the overpressure pilot device includes an overpressure control spring providing the overpressure control force.

18. The system of claim 11, further comprising a restrictor coupled into the first supply line between the inlet of the main valve and the inlet port of the start-up pilot device.

19. The system of claim 18, wherein the restrictor includes one of an adjustable restrictor or an orifice plate.

20. The system of claim 11, wherein the start-up pilot device and the overpressure pilot device are separate physical structures.

21. The system of claim 11, wherein the start-up device and the overpressure pilot device are parts of a common physical construct.

22. A method of providing start-up and overpressure relief functions to a primary fluid carrier using a fluid flow control system that includes a main valve, a start-up pilot device fluidly connected to the main valve, and an overpressure pilot device fluidly connected to the main valve, the method comprising:

exhausting fluid from an inlet of the main valve to the outlet of the main valve through the start-up pilot device via a first supply line extending from the inlet of the main valve to an inlet port of the start-up pilot device and a first exhaust line extending from an outlet port of the start-up pilot device to an outlet of the main valve;

automatically closing the start-up pilot device when a start-up closing pressure sensed by a diaphragm of the start-up pilot device is greater than or equal to a control pressure of the start-up pilot device;

automatically opening the overpressure pilot device when a relief opening pressure sensed by a diaphragm of the overpressure pilot device is greater than or equal to a control pressure of the overpressure pilot device; and exhausting fluid from a gallery of the main valve to the outlet of the main valve while the overpressure pilot device is open via a second supply line extending from the gallery of the main valve to an inlet port of the overpressure pilot device and a second exhaust line extending from an outlet port of the overpressure pilot device to the outlet of the main valve.

23. The method of claim 22, wherein the start-up closing pressure is based on a pressure sensed at the inlet port of the start-up pilot device.

24. The method of claim 22, wherein the relief opening pressure is based on a pressure sensed at the inlet of the main valve.

25. The method of claim 22, wherein at least one of the start-up closing pressure and the relief opening pressure is based on a pressure sensed from a pressure source that is external to the main valve.

26. A method of providing start-up and overpressure relief functions to a primary fluid carrier using a fluid flow control system that includes a main valve, a start-up pilot device fluidly connected to the main valve, and an overpressure pilot device fluidly connected to the main valve, the method comprising:

exhausting fluid from an inlet of the main valve to a first target destination through the start-up pilot device via a first supply line extending from the inlet of the main valve to an inlet port of the start-up pilot device and a first exhaust line extending from an outlet port of the start-up pilot device to the first target destination;

automatically closing the start-up pilot device when a pressure at the inlet port of the start-up pilot device is greater than or equal to a control pressure of the start-up pilot device;

automatically opening the overpressure pilot device when a pressure at the inlet of the main valve is greater than or equal to a control pressure of the overpressure pilot device; and exhausting fluid from a gallery of the main valve to a second target destination through the opened overpressure pilot device via a second supply line extending from the gallery of the main valve to an inlet port of the overpressure pilot device and a second exhaust line extending from an outlet port of the overpressure pilot device to the second target destination.

27. The method of claim 26, further comprising sensing the pressure at the inlet port of the start-up pilot device with a diaphragm of the start-up pilot device.

28. The method of claim 26, further comprising sensing the pressure at the inlet of the main valve with a diaphragm of the overpressure pilot device.

29. The method of claim 26, wherein exhausting fluid to the first target destination comprises exhausting fluid to the outlet of the main valve.

30. The method of claim 26, wherein exhausting fluid to the second target destination comprises exhausting fluid to the outlet of the main valve.

31. The method of claim 26, wherein exhausting fluid to the first target destination comprises exhausting fluid to one of atmosphere, a holding tank, or another fluid recovery system.

32. The method of claim 26, wherein exhausting fluid to the second target destination comprises exhausting fluid to one of atmosphere, a holding tank, or another fluid recovery system.

33. A fluid handling and delivery system including a pipeline or a tank connected to a fluid flow control system according to claim 1.

* * * * *